(12) United States Patent
Yoon et al.

(10) Patent No.: US 8,981,694 B2
(45) Date of Patent: Mar. 17, 2015

(54) SENSORLESS CONTROL APPARATUSES OF MOTORS AND CONTROL METHODS THEREOF

(71) Applicant: Samsung Electronics Co., Ltd., Suwon-Si, Gyeonggi-Do (KR)

(72) Inventors: Young Doo Yoon, Seoul (KR); Jang Hwan Kim, Suwon-si (KR); Jeong Hyoun Sung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 173 days.

(21) Appl. No.: 13/746,834

(22) Filed: Jan. 22, 2013

(65) Prior Publication Data

US 2013/0193886 A1  Aug. 1, 2013

(30) Foreign Application Priority Data

Jan. 26, 2012 (KR) .................. 10-2012-0007618

(51) Int. Cl.
| | |
|---|---|
| H02K 29/06 | (2006.01) |
| H02P 6/00 | (2006.01) |
| H02P 6/16 | (2006.01) |
| H02P 21/00 | (2006.01) |
| H02P 21/14 | (2006.01) |

(52) U.S. Cl.
CPC ............ H02P 6/165 (2013.01); H02P 21/0042 (2013.01); H02P 21/141 (2013.01); H02P 21/146 (2013.01)

USPC .................................................... 318/400.32

(58) Field of Classification Search
CPC .............................. H02P 21/146; H02P 6/182
USPC .................................................... 318/400.32
See application file for complete search history.

(56) References Cited

U.S. PATENT DOCUMENTS

| 7,271,562 B2 * | 9/2007 | Lee et al. ...................... 318/609 |
| 7,969,112 B2 * | 6/2011 | Piippo .......................... 318/609 |
| 8,384,338 B2 * | 2/2013 | Lu et al. ........................ 318/811 |

FOREIGN PATENT DOCUMENTS

| JP | 07-213100 A | 8/1995 |
| JP | 2002-125400 A | 4/2002 |
| JP | 2006-223089 A | 8/2006 |

* cited by examiner

*Primary Examiner* — Erick Glass
(74) *Attorney, Agent, or Firm* — Harness, Dickey & Pierce, PLC

(57) ABSTRACT

A sensorless control apparatus of a motor may include: a position estimator configured to compensate for a resistance and a magnetic flux of a permanent magnet of the motor according to a temperature of the motor, and/or configured to generate an estimated speed of a rotor of the motor based on the compensated resistance and the compensated magnetic flux of the permanent magnet; and/or a speed controller configured to generate a command current based on a command speed of the rotor and the estimated speed of the rotor.

16 Claims, 8 Drawing Sheets

SENSORLESS CONTROL APPARATUSES OF MOTORS AND CONTROL METHODS THEREOF

CROSS-REFERENCE TO RELATED APPLICATION(S)

This application claims priority from Korean Patent Application No. 10-2012-0007618, filed on Jan. 26, 2012, in the Korean Intellectual Property Office (KIPO), the entire contents of which are incorporated herein by reference.

BACKGROUND

1. Field

Some example embodiments of the present disclosure may relate to sensorless control apparatuses of motors configured to estimate the speed and the position of a rotor by detecting currents that are being input to the motor, and/or control methods thereof.

2. Description of Related Art

A motor is an apparatus used in wide range of fields from household appliances, such as washing machines and refrigerators, to various information processing apparatuses. An apparatus for controlling a motor in general is provided with a separate position sensor that is configured to detect the speed and the position of a rotor of the motor. In contrast, a sensorless control method may refer to a method of estimating the speed and the position of a rotor without using a separate position sensor.

As for the sensorless control apparatus as such, a method provided with a current and voltage model of a motor as the basis thereof may be used, and at the model of the motor as such, parameters such as a resistance of the motor and a magnetic flux by a permanent magnet are used. Here, the parameters such as the resistance of the motor and the magnetic flux of the permanent magnet are changed according to the temperature of the motor, and in a case when the changes of the parameters according to the temperature of the motor are not compensated, the error between the actual motor and the model of the motor is increased, and thereby the performance of estimating the speed and the position of the rotor is reduced.

Particularly, in a case of household appliances, such as washing machines, provided with the large change of the load thereof and the larger temperature change of the motor according to the load, the change of the parameters according to the temperature may significantly degrade the sensorless control performance of the motor. In addition, in a severe case, in a state of the motor being out of step, damage of the motor and an inverter by excess current may be caused.

One of the conventional compensation methods of the parameters used is a method of installing an additional temperature sensor at a motor. The method as such is configured in a way that, through the temperature sensor, the temperature of the motor is observed, and then, according to the observed temperature, the parameters are compensated. The method as such is configured to directly measure the temperature of the motor, but on the other hand, by having the additional temperature sensor, the production cost is increased, and the manufacturing process and the overall structure of the control apparatus become more complicated. As for another conventional compensation method of the parameters being used, through the temperature of an inverter module of the motor, the temperature of the motor is estimated, and by using the estimated temperature of the motor, the parameters are compensated. However, since the method as such is configured in a way that the temperature of the motor is estimated through the temperature of the inverter module, the accuracy in estimating the temperature of the motor and the compensating the parameters is low.

SUMMARY

Example embodiments of the present disclosure may provide sensorless control apparatuses for motors configured to estimate the speed and/or the position of rotor of the motors, without using additional temperature sensors, by compensating for the resistance of the motors and/or the magnetic flux of permanent magnets that may be changed according to the temperature of the motor. Example embodiments of the present disclosure also may provide control methods thereof.

In some example embodiments, a sensorless control apparatus of a motor may comprise a position estimator configured to compensate for a resistance and a magnetic flux of a permanent magnet of the motor according to a temperature of the motor, and/or configured to generate an estimated speed of a rotor of the motor based on the compensated resistance and the compensated magnetic flux of the permanent magnet; and/or a speed controller configured to generate a command current based on a command speed of the rotor and the estimated speed of the rotor.

In some example embodiments, the position estimator may be further configured to measure a resistance value of the motor that changes according to the temperature of the motor, may be further configured to estimate the temperature of the motor based on the measured resistance value, and/or may be further configured to estimate a magnetic flux value of the permanent magnet based on the estimated temperature.

In some example embodiments, the position estimator may be further configured to estimate change of the resistance value according to the temperature of the motor by measuring resistance values at a plurality of temperatures in advance.

In some example embodiments, the change of the resistance value according to the temperature of the motor may correspond to a temperature coefficient of the resistance.

In some example embodiments, the position estimator may be further configured to estimate change of the magnetic flux value of the permanent magnet based on the estimated the temperature by temperature characteristics of a residual magnetic flux density of the permanent magnet.

In some example embodiments, the change of the magnetic flux value of the permanent magnet based on the estimated temperature may correspond to a temperature coefficient of the residual magnetic flux density of the permanent magnet of the motor.

In some example embodiments, the position estimator may be further configured to measure the resistance value of the motor through a relationship between voltages and currents input into the motor.

In some example embodiments, the apparatus may further comprise a coordinate convertor configured to convert a coordinate system of a detection current based on an estimated position of the rotor. The position estimator may be further configured to generate the estimated position of the rotor based on the estimated speed of the rotor.

In some example embodiments, the apparatus may further comprise a current controller configured to generate a command voltage based on the command current and the coordinate-system-converted detection current.

In some example embodiments, a sensorless control method of a motor may comprise compensating for a resistance and a magnetic flux of a permanent magnet of the motor according to a temperature of the motor; generating an estimated speed of a rotor of the motor based on the compensated resistance and the compensated magnetic flux of the permanent magnet; and/or generating command current based on a command speed of the rotor and the estimated speed of the rotor.

In some example embodiments, the method may further comprise generating an estimated position of the rotor based on the estimated speed of the rotor; converting a coordinate system of a detection current based on the estimated position of the rotor; and/or generating a command voltage based on the command current and the coordinate-system-converted detection current.

In some example embodiments, the compensating for the resistance and the magnetic flux of the permanent magnet of the motor according to the temperature of the motor may comprise measuring a resistance value that changes according to the temperature of the motor; estimating the temperature of the motor based on the measured resistance value; and/or estimating a magnetic flux value of the permanent magnet of the motor based on the estimated temperature of the motor.

In some example embodiments, the compensating for the resistance and the magnetic flux of the permanent magnet of the motor according to the temperature of the motor may comprise estimating the change of the resistance value according to the temperature of the motor by measuring resistance values at a plurality of temperatures in advance.

In some example embodiments, the compensating for the resistance and the magnetic flux of the permanent magnet of the motor according to the temperature of the motor may comprise estimating the change of the magnetic flux of the permanent magnet of the motor based on the estimated temperature according to temperature characteristics of a residual magnetic flux density of the permanent magnet of the motor.

In some example embodiments, the compensating for the resistance and the magnetic flux the permanent magnet of the motor according to the temperature of the motor may comprise measuring the resistance value through a relationship between voltages and currents input into the motor.

In some example embodiments, a sensorless control apparatus of a motor may comprise an estimator configured to estimate a speed of a rotor of the motor based on a resistance of a permanent magnet of the motor, compensated according to a temperature of the motor, and a magnetic flux of the permanent magnet of the motor, compensated according to the temperature of the motor; and/or a first controller configured to generate a command current based on a command speed of the rotor, and the estimated speed of the rotor.

In some example embodiments, the estimator may be further configured to estimate a position of the rotor of the motor.

In some example embodiments, the estimator maybe further configured to estimate a position of the rotor of the motor based on the estimated speed of the rotor.

In some example embodiments, the apparatus may further comprise a coordinate convertor configured to convert a coordinate system of a detection current based on an estimated position of the rotor. The estimator may be configured to generate the estimated position of the rotor based on the estimated speed of the rotor.

In some example embodiments, the apparatus may further comprise a second controller configured to generate a command voltage based on the command current, and/or the coordinate-system-converted detection current.

In some example embodiments, the apparatus may further comprise a second controller configured to generate a command voltage based on the command current, and/or a detection current based on an estimated position of the rotor.

In some example embodiments, the estimator may be further configured to measure a resistance value of the motor that changes according to the temperature of the motor.

In some example embodiments, the estimator may be further configured to estimate the temperature of the motor based on a measured resistance value of the motor that changes according to the temperature of the motor.

In some example embodiments, the estimator may be further configured to estimate a magnetic flux value of the permanent magnet of the motor based on an estimated temperature of the motor.

In some example embodiments, a change of a value of the resistance of the permanent magnet of the motor, according to the temperature of the motor, may correspond to a temperature coefficient of the resistance of the motor.

In some example embodiments, a change of a value of the magnetic flux of the permanent magnet of the motor, according to the temperature of the motor, may correspond to a temperature coefficient of the magnetic flux of the permanent magnet of the motor.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
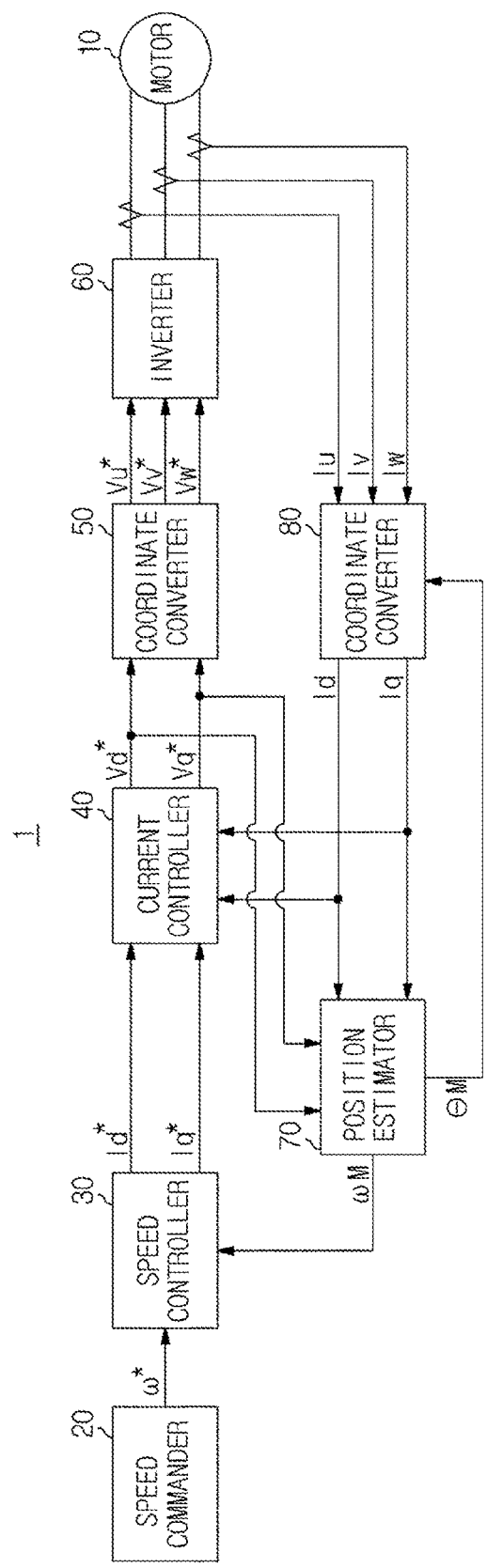
FIG. 1 is a control block diagram schematically illustrating a structure of a control apparatus of a motor in accordance with some example embodiments of the present disclosure.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a control block diagram schematically illustrating a structure of a control apparatus of a motor in accordance with some example embodiments of the present disclosure.

Referring to FIG. 1, a control apparatus 1 of a motor 10 includes a speed commander 20, a speed controller 30, a current controller 40, a coordinate converter 50, an inverter 60, a position estimator 70, and a coordinate converter 80.

The speed controller 30 performs a PI (Proportional Integral) control operation on the difference between a command speed ω* of a rotor that is input from the speed commander 20 and an estimated speed ωM of the rotor, and generates command currents Id* and Iq* such that the estimated speed ωM of the rotor follows the command speed ω* of the rotor. Here, the speed controller 30 may generate the optimal command current according to the driving point of the motor 10.

The current controller 40, performs a PI (Proportional Integral) control operation on the difference between the command currents Id* and Iq*, which are input from the speed controller 30, and detection currents Id and Iq, which are input from the coordinate converter 80, and generates command voltages Vd* and Vq* such that the detection currents Id and Iq follow the command currents Id* and Iq*.

Figure 3:
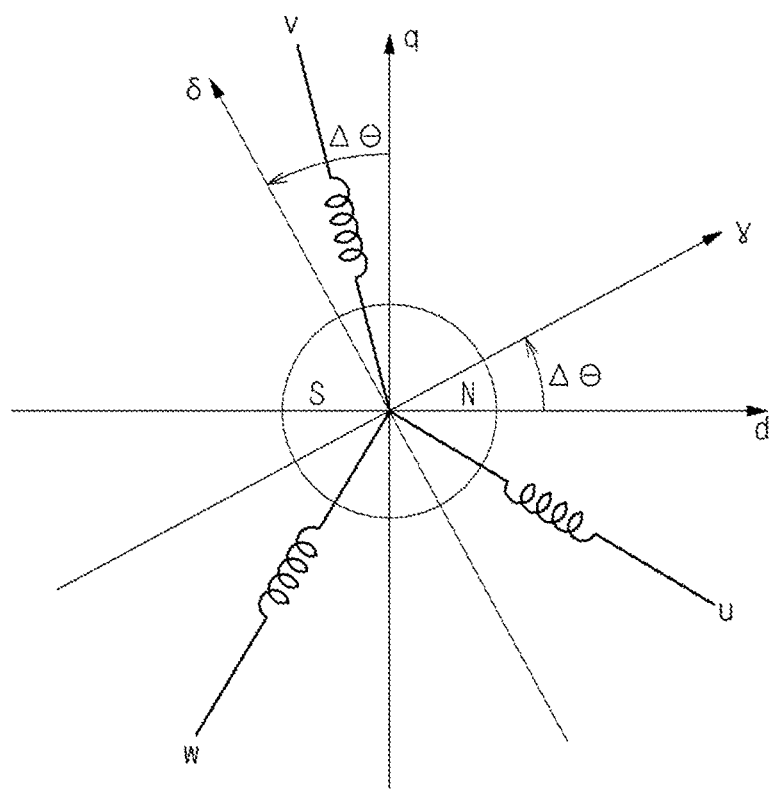
FIG. 3 is a drawing schematically illustrating a synchronous rotation coordinate system and an estimated coordinate system of a rotor of the control apparatus of FIG. 1.

The coordinate converter 50 converts the command voltages Vd* and Vq* that are input from the current controller 40 into three-phase command voltages Vu*, Vv*, and Vw* that may be able to be input into the motor 10 via motor phases u, v, and w (see FIG. 3).

The inverter 60 inputs the three-phase command voltages Vu*, Vv*, and Vw* that are input from the coordinate converter 50 into the motor 10.

The coordinate converter 80 converts three-phase detection currents Iu, Iv, and Iw, which are input from a current detector, into two-phase detection currents Iα and Iβ, and based on an estimated position θM of the rotor, the coordinate converter 80 converts the two-phase currents Iα and Iβ at a stationary coordinate system into detection currents Id and Iq of a rotation coordinate system.

The three-phase detection currents Iu, Iv, and Iw being input into the motor 10 are detected by the current detector. At this time, the current detector, without detecting all of the three-phase currents, may detect the two-phase currents, and then may detect the remaining one-phase current through an operation. Then, the three-phase detection currents Iu, Iv, and Iw are converted into digital data by an analog-to-digital (A/D) converter (not shown), and the three-phase detection currents Iu, Iv, and Iw that are converted into digital data are input into the coordinate converter 80.

The position estimator 70, based on the detection currents Id and Iq being input from the coordinate converter 80 and the command voltages Vd* and Vq* being input from the current controller 40, estimates the position θM of the rotor and the speed ωM of the rotor. A method of estimating the position θM of the rotor and the speed ωM of the rotor at the position estimator 70 will be described in detail with reference to FIG. 2.

Figure 2:
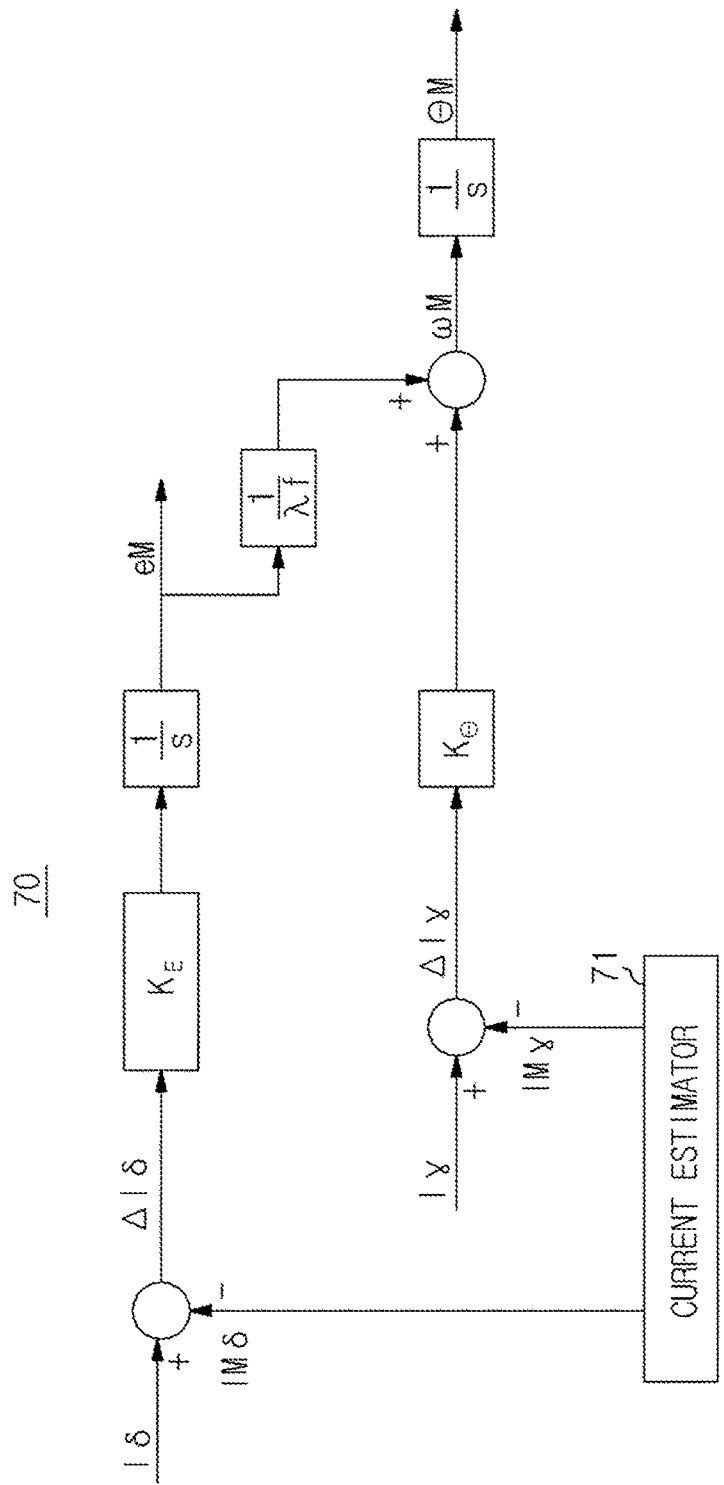
FIG. 2 is a control block diagram schematically illustrating a structure of a position estimator of the control apparatus of FIG. 1.

FIG. 2 is a control block diagram schematically illustrating a structure of a position estimator of the control apparatus of FIG. 1. Here, 1/s indicates an integrator, 1/λf indicates a divider which divides an input by λf, and λf refers to a magnetic flux of a permanent magnet of the motor 10.

Referring to FIG. 2, the position estimator 70, in order to estimate the position θM of the rotor and the speed ωM of the rotor, uses a sensorless control method, and a current estimator 71 estimates currents IMγ and IMδ of a corresponding control cycle through a mathematical model of the motor 10 based on the detection currents Id and Iq that are detected at a previous control cycle and the voltages Vd* and Vq* that are output at a previous control cycle.

The general mathematical model of the permanent magnet synchronous motor 10 is expressed as in mathematical formula 1:

$$\begin{bmatrix} Vd \\ Vq \end{bmatrix} = \begin{bmatrix} Ra + pLd & -\omega Lq \\ \omega Ld & Ra + pLq \end{bmatrix} \cdot \begin{bmatrix} Id \\ Iq \end{bmatrix} + \begin{bmatrix} 0 \\ \omega \phi a \end{bmatrix}$$ [Mathematical Formula 1]

Here, Ra refers to the resistance of the motor 10, ω refers to the speed of the rotor, Ld refers to a d-axis inductance of the motor 10, Lq refers to a q-axis inductance of the motor 10, φa refers to a magnetic flux of a permanent magnet, and p refers to a differential operator (d/dt).

At this time, the d-q axes represent a synchronous rotation coordinate system of the rotor, Vd and Vq refer to voltage values of the rotor of the d-axis and the q-axis on the synchronous rotation coordinate system, respectively, Id and Iq refer to detection current values of the rotor of the d-axis and the q-axis at the synchronous rotation coordinate system, respectively.

The position of the rotor may be assumed to be at γ-δ axes being located at a different position from the actual synchronous rotation coordinate system. As shown on FIG. 3, the coordinate system of the rotor is provided with the synchronous rotation coordinate system of the d-q axes and the estimated coordinate system of the γ-δ axes. The synchronous rotation coordinate system of the d-q axes is composed of the d-axis that corresponds to the position in the direction of magnetic flux of the actual rotor, and the q-axis that is proceeded in a rotation direction from the d-axis by 90 degrees. North pole N and South Pole S of the rotor are as indicated in FIG. 3. The estimated coordinate system of the γ-δ axes is composed of the γ-axis that corresponds to the position of a virtual rotor, and a δ-axis that is proceeded in a rotating direction from the γ-axis by 90 degrees. Then, the position error resulted by the error of the d-q-axes of the synchronous rotation coordinate system and the γ-δ axes of the estimated coordinate system is defined as Δθ. The control apparatus 1 of the motor in accordance with some example embodiments of the present disclosure is configured to control the motor 10 so that the position error Δθ may be at about 0 degrees.

Meanwhile, assuming that the position error Δθ is sufficiently small, mathematical formula 1 above may be expressed as in mathematical formula 2 below:

$$\begin{bmatrix} V\gamma \\ V\delta \end{bmatrix} = \begin{bmatrix} Ra + pLd & -\omega Lq \\ \omega Ld & Ra + pLq \end{bmatrix} \cdot \begin{bmatrix} I\gamma \\ I\delta \end{bmatrix} + e \cdot \begin{bmatrix} -\sin\Delta\theta \\ \cos\Delta\theta \end{bmatrix}$$ [Mathematical Formula 2]

Here, Vγ and Vδ refer to the voltage values of the γ-axis and the δ-axis on the γ-δ axes of the estimated coordinate system of the rotor, respectively, Iγ and Iδ refer to the current values of the γ-axis and the δ-axis on the γ-δ axes of the estimated coordinate system of the rotor, e refers to counter-electromotive force that is generated as the rotor is rotated, and p refers to a differential operator (d/dt).

Meanwhile, at a digital system, the mathematical formula 2 above may be expressed as in a differential equation shown in mathematical formula 3 below:

$$\begin{bmatrix} I\gamma(n) \\ I\delta(n) \end{bmatrix} = \begin{bmatrix} 1 - \frac{Ra}{Ld}T & \omega\frac{Lq}{Ld}T \\ -\omega\frac{Ld}{Lq}T & 1 - \frac{Ra}{Lq}T \end{bmatrix} \cdot$$

$$\begin{bmatrix} I\gamma(n-1) \\ I\delta(n-1) \end{bmatrix} + \frac{T}{LdLq} \cdot \begin{bmatrix} LqV\gamma(n-1) \\ LdV\delta(n-1) \end{bmatrix} +$$

$$\frac{T}{LdLq} \cdot e \cdot \begin{bmatrix} Lq\sin\Delta\theta \\ -Ld\cos\Delta\theta \end{bmatrix}$$ [Mathematical Formula 3]

Here, Iγ(n) and Iδ(n) refer to the current values of the γ-axis and the δ-axis each measured in a n step, respectively, Iγ(n−1) and Iδ(n−1) refer to the current values of the γ-axis and the δ-axis each measured in a n−1 step, respectively, Vγ(n−1) and Vδ(n−1) refer to the voltage values of the γ-axis and the δ-axis each measured in a n−1 step, respectively, and T refers to a sampling period.

Meanwhile, in a case when the γ-δ axes, which are assumed as the position of the rotor, is in match with the d-q axes, which correspond to the actual synchronous rotation coordinate system, a condition that the position error Δθ=0 and the counter-electromotive force e=eM=ωφa is satisfied, and thus a differential equation as in mathematical formula 4 may be obtained:

$$\begin{bmatrix} IM\gamma(n) \\ IM\delta(n) \end{bmatrix} = \begin{bmatrix} 1 - \frac{Ra}{Ld}T & \omega\frac{Lq}{Ld}T \\ -\omega\frac{Ld}{Lq}T & 1 - \frac{Ra}{Lq}T \end{bmatrix} \cdot$$

$$\begin{bmatrix} I\gamma(n-1) \\ I\delta(n-1) \end{bmatrix} + \frac{T}{LdLq} \cdot \begin{bmatrix} LqV\gamma(n-1) \\ LdV\delta(n-1) \end{bmatrix} +$$

$$\frac{T}{LdLq} \cdot eM \cdot \begin{bmatrix} 0 \\ -Ld \end{bmatrix}$$ [Mathematical Formula 4]

According to the mathematical formula 4, the current values IMγ(n) and IMδ(n) of the γ-axis and the δ-axis in the n step may be estimated by using the current values Iγ(n−1) and Iδ(n−1) of the γ-axis and the δ-axis measured in the n−1 step and the voltage values Vγ(n−1) and Vδ(n−1) of the γ-axis and the δ-axis measured in the n−1 step.

Assuming that the position error Δθ is sufficiently small, the difference between the mathematical formula 3 and the mathematical formula 4 may be expressed in an approximated manner as in mathematical formula 5 below:

$$\begin{bmatrix} \Delta I\gamma \\ \Delta I\delta \end{bmatrix} = \frac{T}{LdLq}\begin{bmatrix} Lq \cdot e \cdot \sin\Delta\theta \\ Ld \cdot (eM - e \cdot \cos\Delta\theta) \end{bmatrix} \cong$$

$$\frac{T}{LdLq}\begin{bmatrix} Lq \cdot e \cdot \Delta\theta \\ -Ld \cdot (e - eM) \end{bmatrix}$$ [Mathematical Formula 5]

Here, ΔIγ represents a current error of the γ-axis, and ΔIδ represents a current error of the δ-axis.

According to the mathematical formula 5, the current error ΔIγ of the γ-axis is in proportion to the position error Δθ, and the current error ΔIδ of the δ-axis is in proportion to the error (e−eM) of the counter-electromotive force.

Accordingly, the position estimator 70, by using an estimated gain $K_\theta$ of the position of the rotor and an estimated gain $K_E$ of the counter-electromotive force of the rotor, may generate the estimated position θM of the rotor and the estimated speed ωM of the rotor according to the algorithm illustrated on FIG. 2, and the estimated value eM of the counter-electromotive force is provided for feedforward compensation at the position estimator 70.

Meanwhile, in a case of estimating the position θM of the rotor and the speed ωM of the rotor by using the sensorless control method as such, various parameters are being used, and the resistance Ra of the motor 10 and the magnetic flux φa of a permanent magnet among the various parameters are changed according to the temperature of the motor 10.

Hereinafter, a method of controlling the motor 10 by compensating for the resistance of the motor 10 and the magnetic flux of a permanent magnet will be described in detail.

Figure 4:
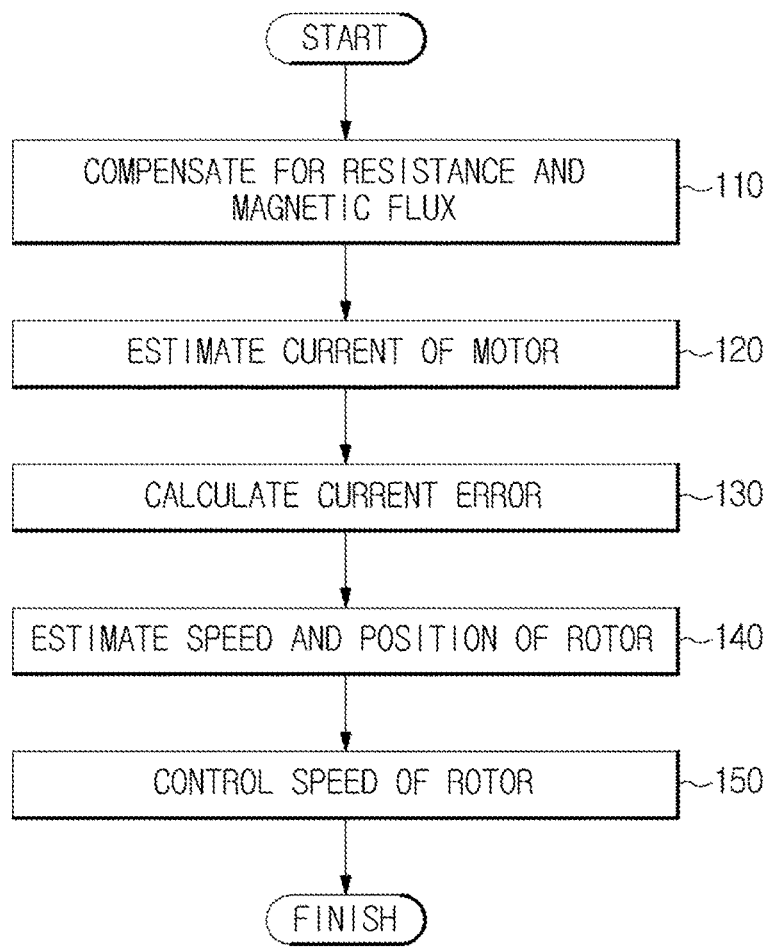
FIG. 4 is a flow chart schematically illustrating a control method of a motor in accordance with some example embodiments of the present disclosure.

FIG. 4 is a flow chart schematically illustrating a control method of a motor in accordance with some example embodiments of the present disclosure.

Referring to FIG. 4, the position estimator 70 compensates for the change of the resistance of the motor 10 and the change of the magnetic flux of the permanent magnet according to the temperature (110). The position estimator 70 estimates the resistance value of the motor 10 and the magnetic flux value of the permanent magnet according to the temperature of the motor 10, and by using the estimated resistance value of the motor 10 and the estimated magnetic flux value of the permanent magnet, a mathematical model of the motor 10 is compensated. A method of compensating for the resistance of the motor 10 and the magnetic flux of the permanent magnet will be described in detail with reference to FIG. 5.

Next, the position estimator 70, through the mathematical model of the motor 10 described above, estimates the current $IM\gamma$ of the γ-axis and the current $IM\delta$ of the δ-axis of the motor 10 (120).

Next, the position estimator 70 calculates the current errors $\Delta I\gamma$ and $\Delta I\delta$ through the difference between the measured currents $I\gamma$ and $I\delta$ of the γ-axis and the δ-axis of the motor 10 and the estimated currents $IM\gamma$ and $IM\delta$ of the γ-axis and the δ-axis of the motor 10 that are estimated by the current estimator 71 (130).

Then, the position estimator 70, by using the estimated gain $K_\theta$ of the position of the rotor and the estimated gain $K_E$ of the counter-electromotive force of the rotor, estimates the position θM of the rotor and the speed ωM of the rotor according to the algorithm described above (140).

Next, the speed controller 30, by using the estimated position θM of the rotor and the estimated speed ωM of the rotor, controls the speed of the rotor (150). In more detail, the speed controller 30 generates the command currents Id* and Iq* so that the estimated speed ωM of the rotor may follow the command speed ω*, and the coordinate converter 80, based on the estimated position θM of the rotor, converts the two-phase detection currents Iα and Iβ of the stationary coordinate system into the detection currents Id and Iq of the rotation coordinate system. Then, the current controller 40 generates the command voltages Vd* and Vq*, so that the detection currents Id and Iq, which are converted into the rotation coordinate system, follow the command currents Id* and Iq*.

Figure 5:
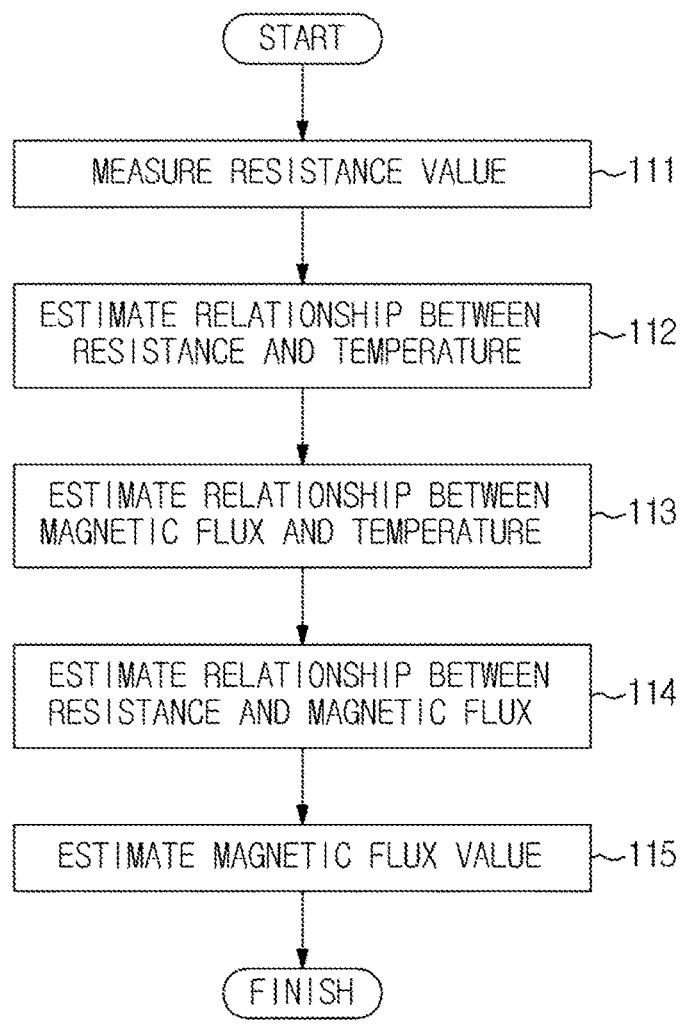
FIG. 5 is a flow chart schematically illustrating a method of compensating for a resistance and a magnetic flux of a permanent magnet according to the control method of FIG. 4.

FIG. 5 is a flow chart schematically illustrating a method of compensating for the resistance and the magnetic flux of the permanent magnet of the control method of FIG. 4. Hereinafter, the following operations 112 and 113 may be omitted in a case of using the relationship of the resistance and the magnetic flux of a permanent magnet that are previously estimated in an off line test.

Referring to FIG. 5, first, the resistance value Ra of the motor 10 is measured (111). At this time, the resistance value Ra of the motor 10 may be measured through the relationship between the voltage and the current that are input into the motor 10 from the inverter 60.

Figure 6:
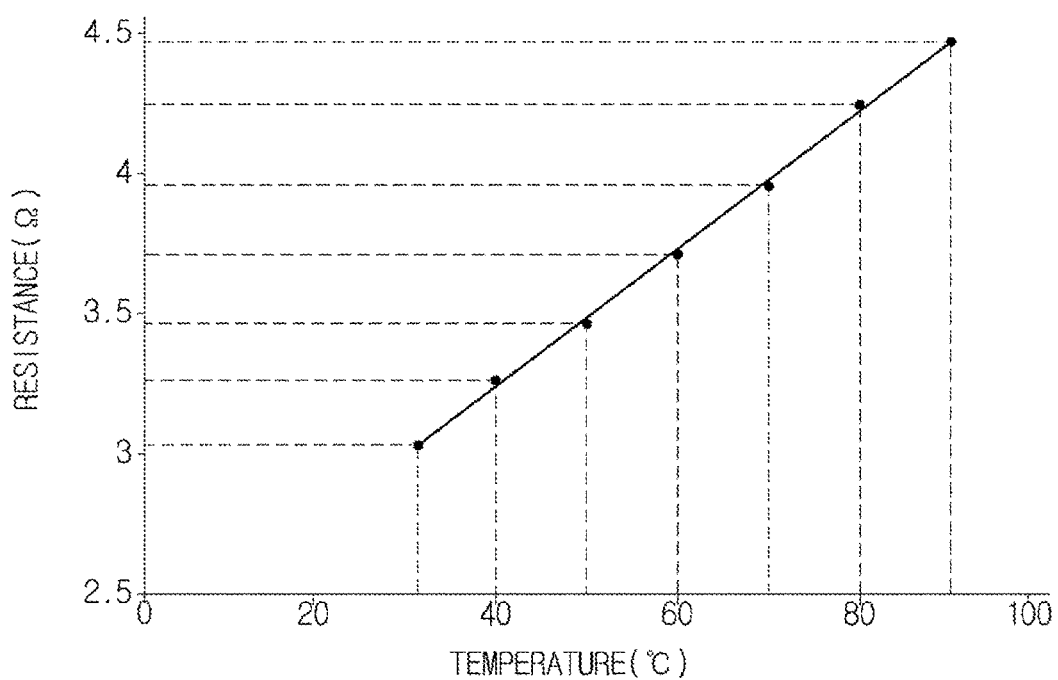
FIG. 6 is a graph schematically illustrating the change of a resistance according to the temperature of a motor.

Next, the position estimator 70 estimates the relationship between the resistance Ra of the motor 10 and the temperature (112). FIG. 6 is a graph schematically illustrating the change of a resistance according to the temperature of a motor. Here, the change of the resistance Ra according to the temperature may be varied by the type of the motor 10.

As illustrated on FIG. 6, the resistance Ra of the motor 10 is increased in a linear manner according to the temperature of the motor 10. Thus, when the resistance values of the motor 10 at a plurality of temperatures are measured through an off-line test, the relationship between the resistance Ra of the motor 10 and the temperature may be expressed in an approximated manner as in the mathematical formula 6 below:

$$Ra = Ra,amb(1+a(T-Tamb))$$ [Mathematical Formula 6]

Here, T represents the temperature of the motor 10, Tamb represents the temperature of the surroundings of the motor 10 (for example, a room temperature of 25° C.), Ra,amb represents the resistance of the motor at room temperature, and 'a' represents the temperature coefficient of the resistance of the motor 10.

Meanwhile, the relationship between the resistance Ra and the temperature estimated though the off-line test is stored at the position estimator 70. Accordingly, the position estimator 70, by using the relationship between the resistance Ra of the motor 10 and the temperature, may be able to estimate the temperature of the motor 10 through the measured resistance Ra.

Figure 7:
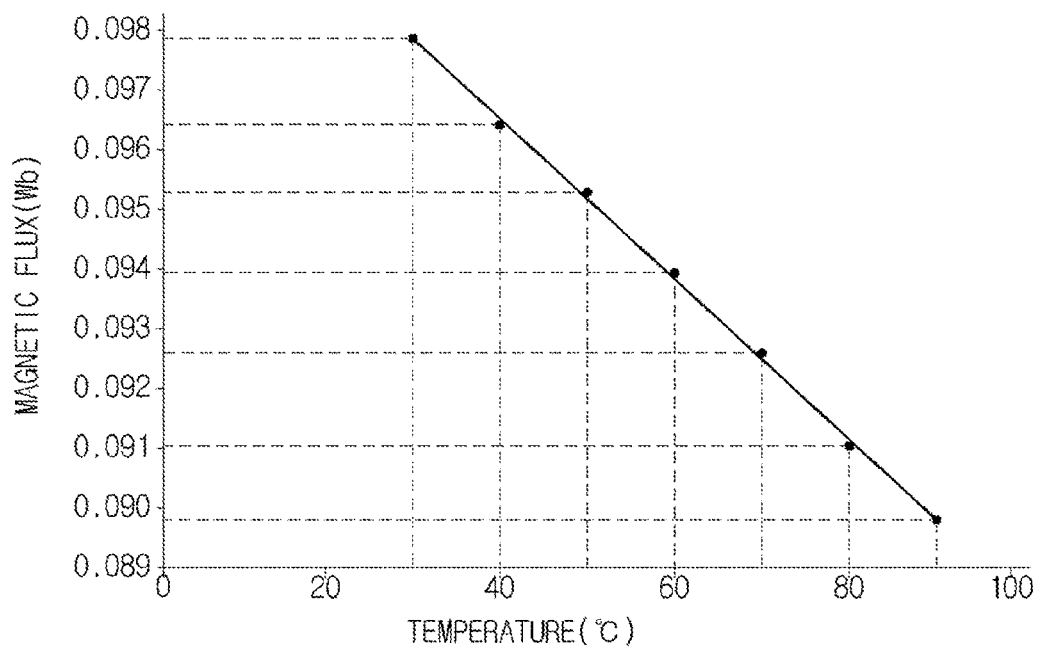
FIG. 7 is a graph schematically illustrating the change of a magnetic flux of a permanent magnet according to the temperature of a motor.

Next, the position estimator 70 estimates the relationship between the magnetic flux φa of the permanent magnet and the temperature (113). FIG. 7 illustrates the change of a magnetic flux of a permanent magnet according to the temperature of a motor 10. Here, the change of the magnetic flux φa may be varied by the type of the permanent magnet.

As illustrated on FIG. 7, the magnetic flux φa of the permanent magnet is decreased in a linear manner according to the temperature of the motor 10. Here, the relationship between the magnetic flux φa and the temperature is a physical constant, and may be expressed as the temperature coefficient of the residual magnetic flux density of the permanent magnet (for example, −0.12% to −0.10%/° C. in a case of a Neodymium-Iron (NdFe) magnet). By checking the type of the permanent magnet used at the motor 10, the relationship between the magnetic flux φa of the permanent magnet and the temperature may be estimated according to the temperature coefficient of the residual magnetic flux density of the permanent magnet.

Accordingly, at the position estimator 70, the relationship between the magnetic flux φa of the permanent magnet and the temperature is stored according to the type of the permanent magnet, and the position estimator 70 may estimate the relationship between the magnetic flux φa of the permanent magnet and the temperature as shown on FIG. 7 by using the magnetic flux value of the permanent magnet and the temperature coefficient of the residual magnetic flux density of the permanent magnet in a room temperature of 25° C.

The relationship between the magnetic flux φa the permanent magnet and the temperature may be expressed in an approximated manner as in mathematical formula 7 below:

$$\phi a = \phi a,amb(1+b(T-Tamb))$$ [Mathematical Formula 7]

Here, φa,amb represents the magnetic flux of the permanent magnet at room temperature, and 'b' represents the temperature coefficient of the residual magnetic flux density of the permanent magnet.

Next, the position estimator 70 estimates the relationship between the resistance Ra and the magnetic flux φa (114). At this time, the relationship of the magnetic flux φa with respect to the resistance Ra may be expressed in mathematical formula 8 below through the mathematical formulas 6 and 7:

$$\phi a = cRa+d$$ [Mathematical Formula 8]

Figure 8:
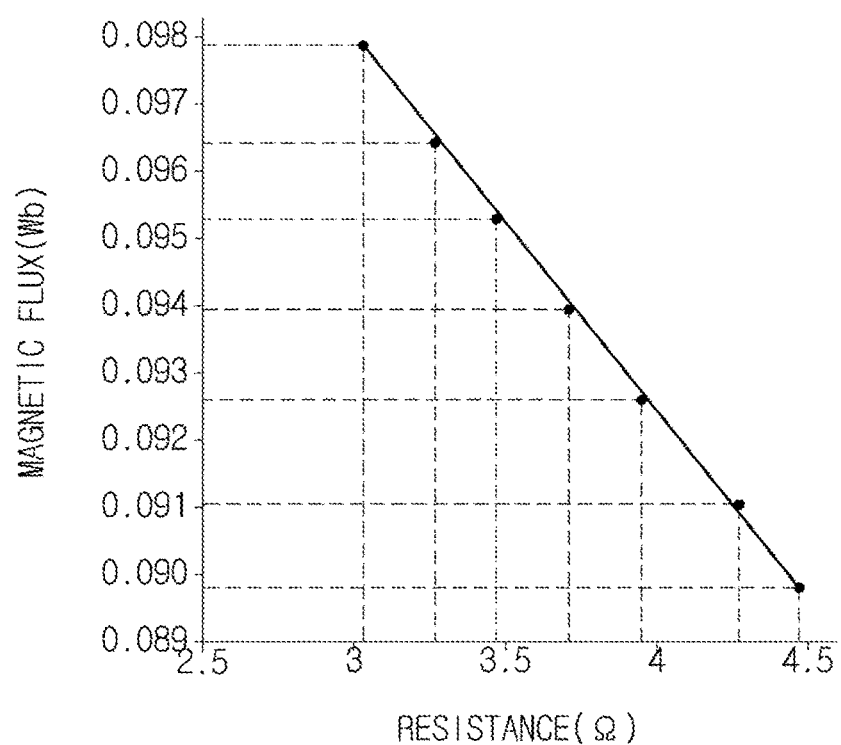
FIG. 8 is a graph schematically illustrating the relationship between a magnetic flux of a permanent magnet with respect to a resistance based on FIGS. 6 and 7.

Here, c and d represent the coefficients of mathematical formula 8, and by using the mathematical formula 8, the relationship of the magnetic flux φa with respect to the resistance Ra may be shown as FIG. 8.

Next, the position estimator 70, through the relationship of the magnetic flux φa and the resistance Ra, estimates the magnetic flux value of the permanent magnet (115). According to such, the position estimator 70 compensates for the mathematical model of the motor 10 by using the resistance value that is measured through the relationship between the voltage and the current being input into the motor 10 and by using the magnetic flux value of the permanent magnet that is estimated through the resistance value. In accordance with the present disclosure, without using a temperature sensor to measure the temperature of the motor 10, by compensating for the resistance value and the magnetic flux value of the permanent magnet according to the temperature of the motor 10, a sensorless control may be performed in a stable manner even in a case when the temperature of the motor 10 is being changed.

While example embodiments have been particularly shown and described, it will be understood by those of ordinary skill in the art that various changes in form and details may be made therein without departing from the spirit and scope of the present invention as defined by the following claims.

What is claimed is:

1. A sensorless control apparatus of a motor, the apparatus comprising:
    a position estimator configured to compensate for a resistance of the motor and a magnetic flux of a permanent magnet of the motor according to a temperature of the motor, and configured to generate an estimated speed of a rotor of the motor based on the compensated resistance and the compensated magnetic flux of the permanent magnet; and
    a speed controller configured to generate a command current based on a command speed of the rotor and the estimated speed of the rotor;
    wherein the position estimator is further configured to measure a resistance value of the motor that changes according to the temperature of the motor, is further configured to estimate the temperature of the motor based on the measured resistance value, and is further configured to estimate a magnetic flux value of the permanent magnet based on the estimated temperature.

2. The apparatus of claim 1, wherein the position estimator is further configured to estimate change of the resistance value according to the temperature of the motor by measuring resistance values at a plurality of temperatures in advance.

3. The apparatus of claim 2, wherein the change of the resistance value according to the temperature of the motor corresponds to a temperature coefficient of the resistance.

4. The apparatus of claim 1, wherein the position estimator is further configured to estimate change of the magnetic flux value of the permanent magnet based on the estimated temperature by temperature characteristics of a residual magnetic flux density of the permanent magnet.

5. The apparatus of claim 4, wherein the change of the magnetic flux value of the permanent magnet based on the estimated temperature corresponds to a temperature coefficient of the residual magnetic flux density of the permanent magnet of the motor.

6. The apparatus of claim 1, wherein the position estimator is further configured to measure the resistance value of the motor through a relationship between voltages and currents input into the motor.

7. The apparatus of claim 1, further comprising:
    a coordinate convertor configured to convert a coordinate system of a detection current based on an estimated position of the rotor;
    wherein the position estimator is further configured to generate the estimated position of the rotor based on the estimated speed of the rotor.

8. The apparatus of claim 7, further comprising:
    a current controller configured to generate a command voltage based on the command current and the coordinate-system-converted detection current.

9. A sensorless control method of a motor, the method comprising:
    compensating for a resistance and a magnetic flux of a permanent magnet of the motor according to a temperature of the motor;
    generating an estimated speed of a rotor of the motor based on the compensated resistance and the compensated magnetic flux of the permanent magnet;
    generating command current based on a command speed of the rotor and the estimated speed of the rotor;
    generating an estimated position of the rotor based on the estimated speed of the rotor;
    converting a coordinate system of a detection current based on the estimated position of the rotor; and
    generating a command voltage based on the command current and the coordinate-system-converted detection current;
    wherein the compensating for the resistance and the magnetic flux of the permanent magnet of the motor according to the temperature of the motor comprises:
        measuring a resistance value that changes according to the temperature of the motor;
        estimating the temperature of the motor based on the measured resistance value; and
        estimating a magnetic flux value of the permanent magnet of the motor based on the estimated temperature of the motor.

10. The method of claim 9, wherein the compensating for the resistance and the magnetic flux of the permanent magnet of the motor according to the temperature of the motor comprises:
    estimating the change of the resistance value according to the temperature of the motor by measuring resistance values at a plurality of temperatures in advance.

11. The method of claim 9, wherein the compensating for the resistance and the magnetic flux of the permanent magnet of the motor according to the temperature of the motor comprises:
    estimating the change of the magnetic flux of the permanent magnet of the motor based on the estimated temperature according to temperature characteristics of a residual magnetic flux density of the permanent magnet of the motor.

12. The method of claim 9, wherein the compensating for the resistance and the magnetic flux the permanent magnet of the motor according to the temperature of the motor comprises:
    measuring the resistance value through a relationship between voltages and currents input into the motor.

13. A sensorless control apparatus of a motor, the apparatus comprising:
    an estimator configured to estimate a speed of a rotor of the motor based on:
        a resistance of the motor, compensated according to a temperature of the motor, and
        a magnetic flux of a permanent magnet of the motor, compensated according to the temperature of the motor; and
    a first controller configured to generate a command current based on:

a command speed of the rotor, and
the estimated speed of the rotor;
wherein the estimator is further configured to estimate the temperature of the motor based on a measured resistance value of the motor that changes according to the temperature of the motor.

14. The apparatus of claim 13, wherein the estimator is further configured to estimate a position of the rotor of the motor.

15. The apparatus of claim 13, further comprising:
a coordinate convertor configured to convert a coordinate system of a detection current based on an estimated position of the rotor;
wherein the estimator is further configured to generate the estimated position of the rotor based on the estimated speed of the rotor.

16. The apparatus of claim 13, wherein a change of a value of the resistance of the motor, according to the temperature of the motor, corresponds to a temperature coefficient of the resistance of the motor.

* * * * *